Figure 1:
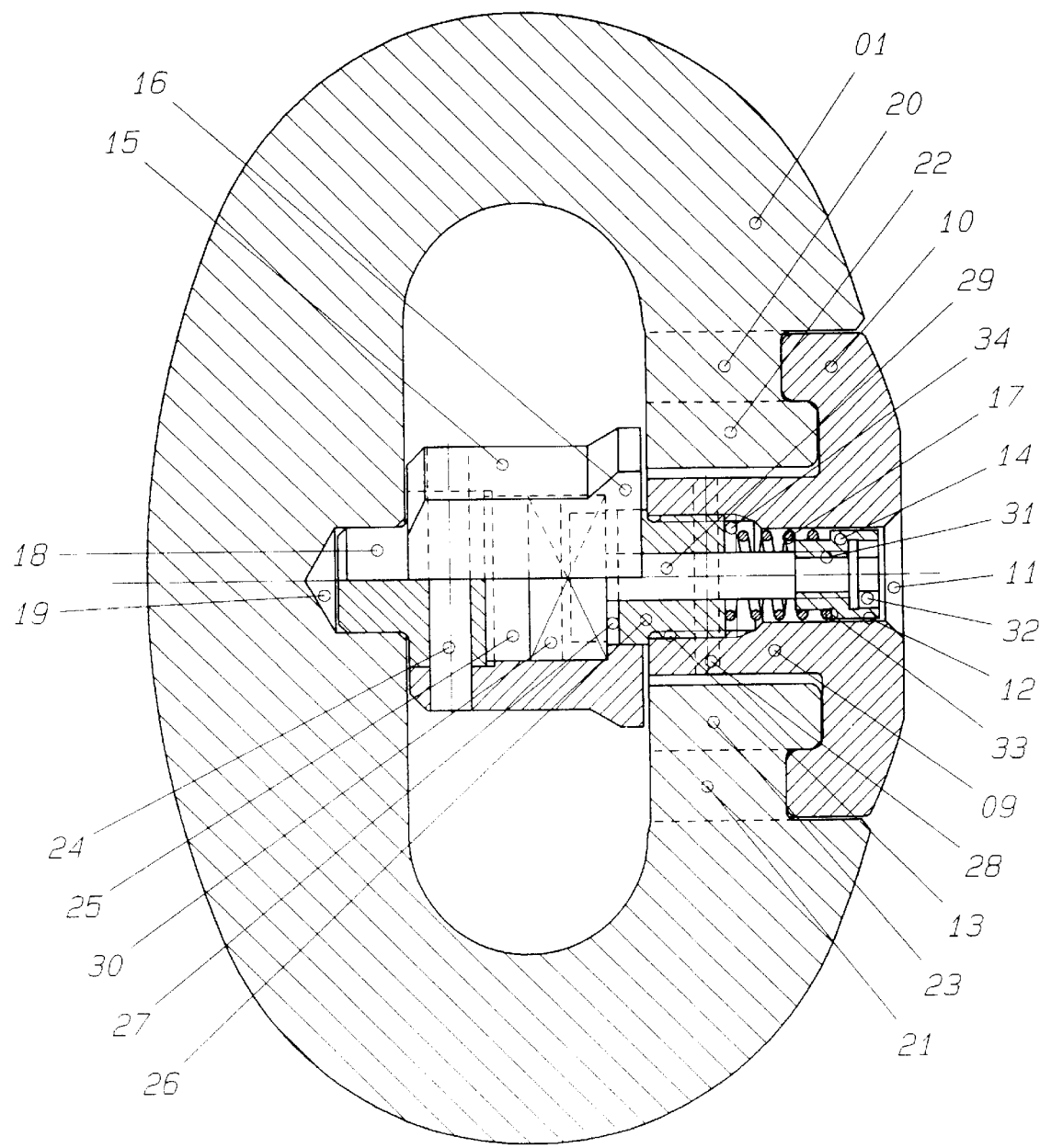

United States Patent

Grootveld

[11] Patent Number: 5,878,565
[45] Date of Patent: Mar. 9, 1999

[54] CLOSABLE CHAIN LINK

[76] Inventor: Robert Grootveld, Everocken 2, 3271 AE, Mijnsheerenland, Netherlands

[21] Appl. No.: 990,666

[22] Filed: Dec. 15, 1997

[30] Foreign Application Priority Data

Dec. 20, 1996 [NL] Netherlands .................... 1004866

[51] Int. Cl.$^6$ .................................................. F16G 15/00
[52] U.S. Cl. ................................................ 159/85; 59/78
[58] Field of Search .................................. 59/78, 84, 85

[56] References Cited

U.S. PATENT DOCUMENTS

| | | | |
|---|---|---|---|
| 1,776,515 | 9/1930 | Leahy et al. | 59/85 |
| 1,787,926 | 1/1931 | Allen | 59/85 |
| 2,382,344 | 8/1945 | Pierre | 59/85 |
| 2,398,897 | 4/1946 | Pierre | 59/85 |
| 2,537,405 | 1/1951 | Gilbert | 59/85 |

FOREIGN PATENT DOCUMENTS

| | | | |
|---|---|---|---|
| 465005 | 5/1950 | Canada | 59/85 |
| 0 392 219 A | 10/1990 | European Pat. Off. | |
| 291665 | 12/1931 | Italy | 59/84 |
| 8 502 630 A | 4/1987 | Netherlands | |
| 2180910 | 4/1986 | United Kingdom | |

*Primary Examiner*—David Jones
*Attorney, Agent, or Firm*—Kinney & Lange, P.A.

[57] ABSTRACT

Closable chain link (1) with an open limb (2), comprising a filler (9) connected to a locking member rotatable relative thereto, which is confined within the space enclosed by the link (1) so as to be restrained from sliding movement in axial direction and is fitted with an axially slidable locking mechanism (29, 30) arranged internally of the locking member (15). By compression of a spring (17), which normally keeps the locking mechanism (29, 30) in the locked position, this mechanism (29, 30) can be brought in a position wherein the locking member (15) is coupled to the retaining member (14) in the direction of rotation.

19 Claims, 2 Drawing Sheets

CLOSABLE CHAIN LINK

This invention relates to a closable chain link having an open limb adapted to receive a filler connected to a locking member rotatable relative thereto, the locking member being positioned in the space enclosed by the link when the link is closed and having two opposed flat sides, the mutual distance between which is smaller than the passage in the open limb, while the dimension of the locking member in a direction parallel to the flat sides is greater than the passage closed by the filler in the closed position of the link, the filler and the locking member being interconnected by a retaining member disposed in an externally accessible chamber of the filler and having an enlarged head, the retaining member being connected to the locking member and being loaded by a spring in a direction such that the filler and the locking member are blocked relative to each other in the direction of rotation, the locking member terminating in a journal receivable for support in a chamber provided in the continuous limb of the chain link, while the retaining member for the locking member comprises a cylindrical nut screwable onto a threaded end of the locking member.

Such a chain link is known from NL-A-8502630. The locking member of that chain link consists of a single piece and is received for axial sliding movement in the space enclosed by the link. The lock against rotation consists of a narrow ridge provided on the end face of the locking member proximal to the filler, this narrow ridge being receivable in a slot provided in the filler, which slot continues into the two collars of the body of the chain link, on opposite sides of the passage in that link. In the event of damage of this slot and/or narrow ridge, it may prove difficult or even impossible for the ridge to be received in the slot mentioned. The same effect can occur as a result of deposition of dirt in the unshielded slot. In either case the locking against relative rotation of filler and locking member is no longer guaranteed, thus entailing a safety hazard.

Such a safety hazard can also arise in the event of a high impact on the chain link giving rise to an axial displacement of the locking member, which constitutes a relatively heavy mass, so that the locking member may slip out of the lock against rotation.

The object of the invention is to provide a chain link of the above-described type, whereby these safety hazards are obviated. To that effect, the chain link according to the invention is characterized in that the locking member is received within the space enclosed by the link so as to be restrained from sliding movement in axial direction and is fitted with an axially slidable locking mechanism arranged internally of the locking member, which locking mechanism is held in the locked position under the influence of the spring acting on the retaining member, and by compression of the spring can be brought in a position wherein the locking member is coupled to the retaining member in the direction of rotation.

In this way the mutual locking of filler and locking member is screened from the exterior. The kinetic energy of the parts under spring pressure as produced upon impact, if any, is considerably reduced, so that slipping of the lock is no longer to be feared.

Further elaborations of the closable chain link according to the invention are described in more detail in the subclaims.

Figure 2:
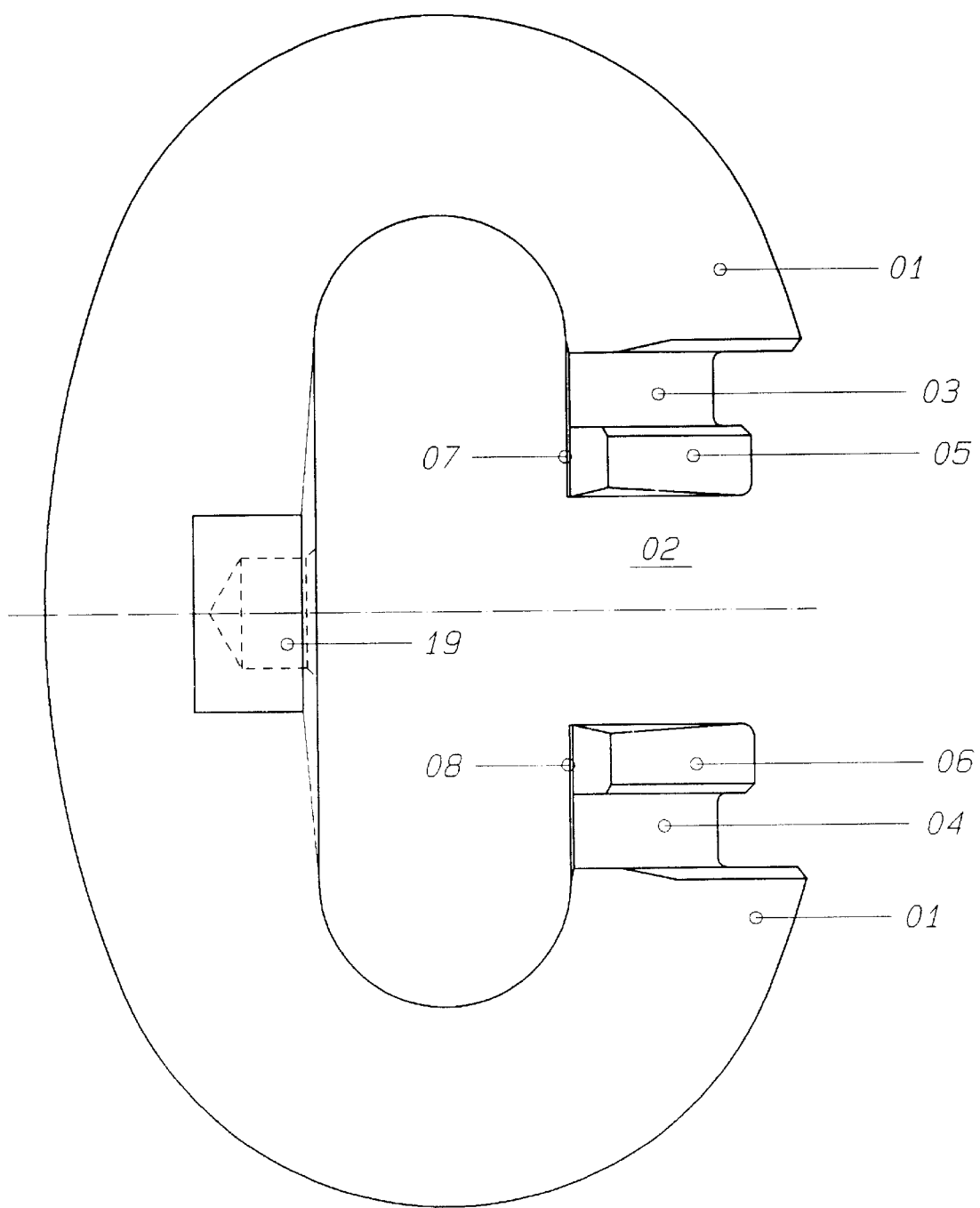

One embodiment of the chain link according to the invention will be further elucidated with reference to the drawings, in which:

FIG. 1 is a cross section of the chain link with a safety lock according to the invention; and FIG. 2 is an elevational view of the chain link without filler.

The chain link according to FIG. 2 is substantially identical to the chain link according to Dutch patent application 8502630 and includes a C-shaped body 1 with a passage 2 provided between the facing ends 5, 6 of the open limb. Provided in the continuous limb of the link, opposite the passage 2, is a chamber 19. On either side of the passage 2 the free ends of the chain link have a narrowed portion 3, 4 adjoining collars 5, 6 which are slightly thickened with respect to portions 3, 4. On the inside of the collars 5, 6 the faces 7, 8 have been subjected to a metal-removing operation.

The filler 9, like the chain link 1, is substantially identical to the filler according to Dutch patent application 8502630. This filler includes a rectangular portion adapted to be placed in the passage 2, linking up with an enlarged head 10. This enlarged head is provided at the upper and lower side thereof with a fork 20, 21, respectively, engageable about the corresponding narrowed portion 3, 4 of the chain link 1. Provided between the fork 20, 21 and the rectangular central portion of the filler 9 is a recessed chamber 22, 23, respectively, for receiving the collars 5, 6, respectively, of the chain link 1. The shape of the filler 9 is such as to ensure proper transmission of the tensile forces in the open limb of the chain link 1.

Provided in the rectangular portion of filler 9 is a bore 12 merging into a threaded chamber 13 of larger diameter. The bore 12 continues as far as the outer face of the enlarged head 10 of the filler 9 and terminates in a bevel 11. The non-axially moveable locking member fitted with the separate safety lock comprises:

- a cylindrical housing 15 provided with two flat faces 16 located opposite each other at a mutual distance smaller than the passage 2 between the facing ends 5, 6 of the open limb of the link. In the housing 15 a stepped bore is provided.
- a journal 18 pressed in the housing 15 and locked against rotation by means of a dowel pin 24, which journal 18 in mounted condition is supported in the chamber 19 provided in the continuous limb of the chain link 1. The journal 18 is provided with a carrier slot 25, which is arranged in the center of the end face located in the housing 15.
- a bolt 26 with a centric through-bore, having a cylindrical head provided with a locking slot 27 provided through the center of the end face. This bolt 26 with cylindrical head is screwed into the threaded chamber 13 in the rectangular portion of the filler 9 and locked against rotation by an eccentrically arranged dowel pin 28.
- a central pin 29 with a rectangular head 30 which is a sliding fit in the slots 27 and 25 of the through-bore cylindrical-head bolt 26 and of the journal 18, respectively. The central pin 29 is provided with thread 31 at the end opposite to the rectangular head 30, with a cylindrical nut 14 fitting on thread 31.
- a cylindrical nut 14 provided with an internal hexagonal keyhole 32 and a collar 33. The collar 33 serves as a spring cup against which abuts the compression spring 17, which can be set for a predetermined spring force by tightening the nut 14.

The removal of the filler 9 with the locking member 15 coupled thereto from the closed position of the chain link shown in FIG. 1 is effected as follows.

The locking member, more particularly the housing 15 with the faces 16 parallel to the plane of the paper, must be rotated a quarter-turn until these faces 16 are in a position perpendicular to the plane of the paper. In that position the locking member can pass the passage 2 in the chain link 1 and be taken out together with the filler. To be able to rotate the locking member, the safety lock must be uncoupled. To that end, by means of a key inserted into the key hexagon 32 of nut 14, the nut 14 is moved inwardly against the pressure of the spring 17. As a consequence, the part of the rectangular head 30 of the central pin 29 disposed in the locking slot 27 is displaced into the carrying slot 25 of journal 18, so that by means of the same key the journal with the housing 15 coupled thereto can be rotated through 90° into the removal position of the locking member, whereupon the pressure exerted on the nut 14 can be removed.

When using the chain link in damp and dusty surroundings, as is typically the case in bulk transshipment, there is a chance the chamber 34 in the filler 9 with the spring 17 accommodated therein becomes fouled or corrodes, so that the safety lock consisting of the pin 29 with the head 30 is no longer inwardly movable through a pressure exerted on the nut 14. In that case, as with the construction according to Dutch patent application 8502630, the nut 14 can be loosened and be removed from the bore 12, whereupon the compression spring 17 can be removed from the chamber 34 in order to clean the latter or to replace the spring 17, while further the chamber 34 can be provided with a clean lubricant.

I claim:

1. In a closable chain link having an open limb enclosing a space, the open limb defining a passage which receives a filler rotatable connected to a locking member by a retaining member, said locking member being positioned in the space enclosed by the link, said locking member having two opposed flat sides with a mutual distance between the opposed flat sides and a height parallel to the opposed flat sides, the mutual distance being smaller than the passage, the height being larger than the passage, said retaining member being at least partially disposed in an externally accessible chamber of the filler and having an enlarged head, said retaining member being connected to the locking member and being loaded by a spring to bias the locking member into a position in which the filler and the locking member are blocked relative to each other against rotation, the locking member terminating in a journal receivable for support in a chamber provided in the limb of the chain link, the retaining member comprising a cylindrical nut with threads, an improvement comprising:

an opening defined internally in the locking member; and a slidable locking mechanism received in the opening of the locking member, which locking mechanism comprises a threaded end onto which the cylindrical nut is screwed, the locking mechanism being biased toward a locked position by the spring acting on the retaining member, the locking mechanism being movable by compression of the spring into a position wherein the locking member is coupled to the retaining member and the locking member and the retaining member are rotatable relative to the filler.

2. The improvement according to claim 1, wherein the opening is a hollow chamber of stepped design, which is closed on a side remote from the filler by the journal secured in the hollow chamber, which journal on a side proximal to the filler provides a slot in which the locking mechanism is receivable so as to form a coupling which prevents rotation between the locking member and the locking mechanism.

3. The improvement according to claim 1, wherein the filler comprises a threaded chamber, further comprising a bolt with a centric through-bore, which bolt is screwable and securable in the threaded chamber in the filler, the bolt having an end face proximal to the journal provided with a locking slot for partly receiving therein the locking mechanism to prevent rotation of the locking mechanism relative to the filler.

4. A closable chain link comprising:

a link having a C-shape with a continuous side and two ends opposite the continuous side, each of the ends including a collar, the two ends defining a passage therebetween, with a chamber being defined in the continuous side, the link defining a space within the C-shape;

a filler non-rotatably received in the passage in a closed position wherein the filler is coupled to the collars of each of the two ends to transmit tensile stress between the two ends, the filler being outwardly slidable from the closed position;

a locking member received in the space of the link, the locking member terminating in a journal received in the chamber in the continuous side of the link, the locking member having two opposed flat sides with a mutual distance between the opposed flat sides and a height, the mutual distance being smaller than the passage, the height being larger than the passage, the locking member being rotatable between a locked position wherein the height of the opposed flat sides prevents outward movement of the locking member relative to the link and an unlocked position wherein the mutual distance allows the opposed flat sides to slide through the passage, the locking member having an opening defined therein;

a pin slidably received within the opening of the locking member between a non-rotating position wherein the pin engages the filler such that the pin is non-rotatable relative to the filler and a rotating position wherein the pin is rotatable relative to the filler, the pin being secured from rotation relative to the locking member, the pin extending away from the locking member to a first end with an enlargement; and a spring positioned against the enlargement of the pin to bias the pin toward the non-rotating position;

wherein the closable chain link can be opened by pressing the pin against the spring from the non-rotating position to the rotating position, then rotating the pin in combination with the locking member to the unlocked position, and then sliding the filler in combination with the locking member from the closed position while the opposed flat sides slide through the passage.

5. The closable chain link of claim 4, wherein the filler has an externally accessible chamber defined therein, and wherein the pin is accessible through the externally accessible chamber to allow pressing of the pin and rotation of the pin.

6. The closable chain link of claim 5, wherein the enlargement of the pin comprises a head with a hexagonal recess to facilitate rotation of the pin with a hexagonal tool.

7. The closable chain link of claim 4, wherein the enlargement of the pin is provided by a cylindrical nut screwed onto a threaded end of the pin.

8. The closable chain link of claim 4, wherein a locking slot rigidly secured to the filler engages the pin in the non-rotating position to prevent the pin from rotating relative to the filler.

9. The closable chain link of claim 8, wherein the filler comprises an internally threaded chamber, and wherein the locking slot is provided by a bolt with external threads screwed into the internally threaded chamber.

10. The closable chain link of claim 9, wherein the bolt has a centric through-bore through which the pin extends.

11. The closable chain link of claim 8, wherein the locking slot is open toward the journal.

12. The closable chain link of claim 4, wherein the filler comprises an internally threaded chamber, and wherein spring biases against a shoulder provided by a bolt with external threads screwed into the internally threaded chamber.

13. The closable chain link of claim 4, wherein the pin has a second end opposite the first end and toward the locking member, the second end having a head with corners which engage the filler in the non-rotatable position and which engage the locking member in the rotating position.

14. The closable chain link of claim 4, wherein the locking member is received within the space enclosed by the limb so as to be restrained from sliding movement in an axial direction.

15. The closable chain link of claim 4, wherein the opening of the locking member is a hollow chamber of stepped design with steps which increase in size away from the filler.

16. The closable chain link of claim 15, wherein the hollow chamber is closed on a first end away from the filler by the journal.

17. The closable chain link of claim 4, wherein the journal comprises a slot open toward the pin, and wherein the pin in the rotating position is received in the slot so as to couple the locking member to the pin and to prevent rotation of the locking member relative to the pin.

18. The closable chain link of claim 4, wherein the locking member is rotatable about a locking member axis, and wherein the pin in the rotating position is rotatable about the locking member axis.

19. The closable chain link of claim 4, wherein, while biasing the pin toward the nonrotating position, the spring simultaneously biases the filler toward the closed position.

* * * * *